(No Model.)
O. VANORMAN.
CARBURETOR.
No. 457,803. Patented Aug. 18, 1891.
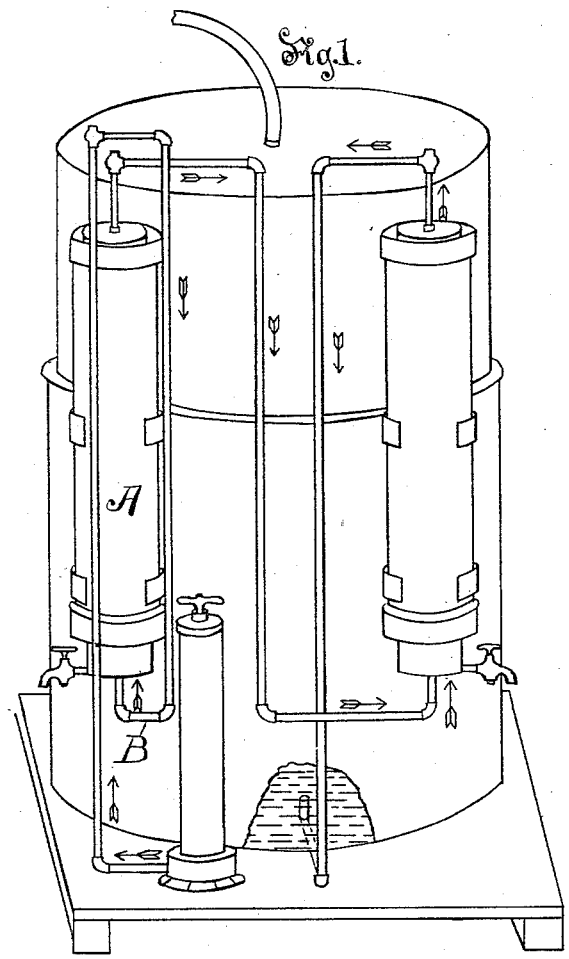
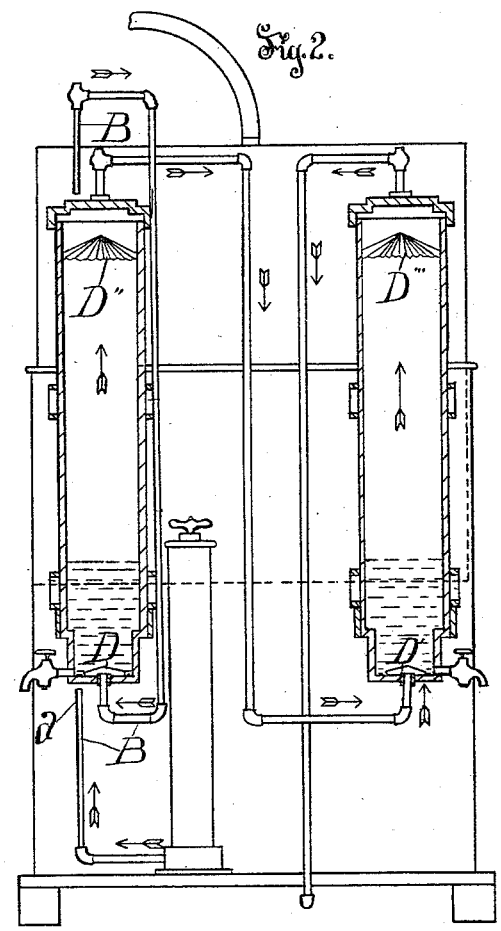
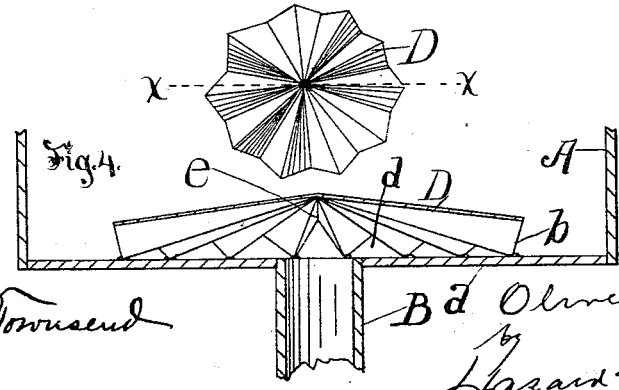
Witnesses.
M. M. Gee.
Alfred I. Townsend
Inventor.
Oliver Vanorman
by Hazard & Townsend
his atty

UNITED STATES PATENT OFFICE.

OLIVER VANORMAN, OF LOS ANGELES, CALIFORNIA.

CARBURETOR.

SPECIFICATION forming part of Letters Patent No. 457,803, dated August 18, 1891.

Application filed June 19, 1890. Serial No. 355,940. (No model.)

*To all whom it may concern:*

Be it known that I, OLIVER VANORMAN, a citizen of the United States, residing at Los Angeles, in the county of Los Angeles and State of California, have invented a new and useful Improvement in Gas-Machines, of which the following is a specification.

My invention relates to apparatus for manufacturing gas by charging atmospheric air with vapors from crude petroleum and lighter oils.

In the process to which my invention particularly relates the air is brought into direct contact first with the crude petroleum by passing the air upward through a shallow charge of such oil contained in a tall and proportionately-slim chamber, after which the air thus charged is passed upward through a shallow charge of the benzine in a similar tall and slim chamber. No claim is made herein to such process, which is made the subject-matter of a separate application for patent, filed as a division of this application January 6, 1891.

The invention hereinafter described and claimed relates specially to the peculiar device employed by me for introducing the air to the oil and producing the desired mingling of the same therewith, which is necessary to produce a sufficient carbureting of the air during the limited interval occupied in passing through the shallow charge of oil I have found it best to employ. The means heretofore employed for introducing the air to the oil has consisted of a rose or a perforated pipe or of a nozzle so disposed as to give a rotary motion to the oil and the ascending air, or of a rose and a plain deflector having a conical cavity and having its lower rim serrated to divide the air. All of such means for introducing the air to the oil are impractical for use in my improved process above referred to for the following reasons: First, the nozzle does not bring the air into such close contact with the oil as is necessary to impregnate the air with the vapors of the slightly volatile oil I use; second, the air is liable to escape from the plain deflector in large bubbles through the serrations at one side of the deflector by reason of the unequal pressure upon the air in the deflector caused by the swashing or regurgitation of the liquid; third, the rose which has heretofore been used to prevent such swashing or regurgitation is liable to become clogged by such thick oil, and whenever the apparatus is at rest such oil settles into the air-pipe and fills it to a level with the oil in the tank, and its expulsion through the fine perforations of the rose is difficult and cannot be accomplished without a very great pressure of the air in the pipe.

By my invention I am enabled to dispense with the rose and yet produce the subdivision of air necessary to practice the said process and absolutely prevent the air from ascending in large bubbles.

My improvement consists in the combination of the carbureting-tank, an air-ingress pipe having an unobstructed mouth opening upward through the floor of such tank, means for forcing air through such pipe into the tank, and a circular cap or reflector having its under face formed with a conical cavity closed at the top and having such under face provided with radial channels extending from the apex of such cavity to the rim of the deflector.

The accompanying drawings illustrate gas-manufacturing apparatus provided with my improvement.

Figure 1 is a general perspective view of the machine in which my device is used. Fig. 2 is a view of the same, with the carburetors shown in vertical mid-section. Fig. 3 is a top view of my improved deflector or air-distributing device. Fig. 4 is a vertical mid-section of the bottom of the carburetor provided with my improvement.

My invention consists of the combination, with the carbureting-tank A, having an unobstructed open-mouthed air-ingress pipe B, opening upward through the floor *a* of such tank, of a flat circular cap or deflector B, having its under face provided with a flat conical corrugated chamber *e*, having its corrugations or channels triangular in cross-section and widened and enlarged downward and outward from the apex to the rim of the deflector, which deflector is fixed in place with its chamber upon the floor of the carburetor coaxial with the air-ingress pipe, so that the ascending air forced through the air-ingress pipe will be received in the flat apex of the chamber of the cap, which, by reason of its flat or shallow character, does not allow the collection of a large bubble of air; but immediately the air reaches the apex it begins to find its way downward and outward along the radiate channels $d$, the top of each of which is but slightly inclined, as shown in Fig. 4, and is thus distributed through the channels to the rim of the deflector. The ridges $b$, which increase in size from the center to the circumference of the deflector, obstruct the hydrocarbon liquid and prevent it from moving with the swashing movement which I desire to prevent.

My improved deflector is preferably formed of a conical radially-crimped cap of sheet metal, closed at the top and secured upon the floor above the open pipe and coaxial therewith. By this contrivance the air entering through the pipe rises through the oil to the apex of the cone and then returns, flowing downward along the creases or channels formed by the crimps and out of the cap around its periphery uniformly at intervals corresponding to the crimps. The action and results thus produced are superior to that which I have been able to produce by any other means, as it more thoroughly breaks the oil and mingles the air more evenly therewith, and there is no danger of clogging.

Now, having described my invention, what I claim as new, and desire to secure by Letters Patent, is—

The combination, with a carbureting-tank having an unobstruced open-mouthed air-ingress pipe opening upward through the floor of such tank, of a flat circular deflector having its under face provided with the flat conical corrugated chamber having its channels enlarged downward and outward from the apex to the rim of the deflector, said deflector being fixed in place upon the floor with its conical chamber coaxial with the air-ingress pipe, so that the ascending air forced through the air-ingress pipe will be received in the flat apex of the chamber of the cap and distributed through the channels to the rim of the deflector.

OLIVER VANORMAN.

Witnesses:
JAMES R. TOWNSEND,
ALFRED I. TOWNSEND.